(12) United States Patent
Sillanpää

(10) Patent No.: US 6,840,572 B2
(45) Date of Patent: Jan. 11, 2005

(54) ARRANGEMENT IN HATCH STRUCTURE

(75) Inventor: Jukka Sillanpää, Sauvo (FI)

(73) Assignee: Webasto-Parabus LTD, Raisio (FI)

( * ) Notice: Subject to any disclaimer, the term of this patent is extended or adjusted under 35 U.S.C. 154(b) by 0 days.

(21) Appl. No.: 10/472,231

(22) PCT Filed: Mar. 22, 2002

(86) PCT No.: PCT/FI02/00248
§ 371 (c)(1),
(2), (4) Date: Sep. 22, 2003

(87) PCT Pub. No.: WO02/076777
PCT Pub. Date: Oct. 3, 2002

(65) Prior Publication Data
US 2004/0094994 A1 May 20, 2004

(30) Foreign Application Priority Data
Mar. 23, 2001 (FI) .............................................. 20010600

(51) Int. Cl.⁷ ............................................ B60J 7/08
(52) U.S. Cl. ..................... 296/215; 296/216; 296/219; 296/221; 296/222; 296/224; 52/200; 52/66; 52/72
(58) Field of Search ............................... 52/18, 39, 58, 52/66, 72, 199–200, 202, 203, 219, 717.01, 718.01, 718.04; 114/201 R, 202, 211; 296/215–216.09, 219, 221, 222, 224

(56) References Cited

U.S. PATENT DOCUMENTS

| | | | | |
|---|---|---|---|---|
| 2,226,824 A | * | 12/1940 | Larson | 292/263 |
| 3,736,883 A | * | 6/1973 | Yang et al. | 105/377.05 |
| 3,952,790 A | * | 4/1976 | Leitch | 160/193 |
| 4,021,073 A | * | 5/1977 | Manning | 296/223 |
| 4,329,917 A | | 5/1982 | Fisher et al. | |
| 4,372,603 A | * | 2/1983 | Stanczak et al. | 296/146.12 |
| 4,412,404 A | * | 11/1983 | Manning | 52/19 |
| 4,523,785 A | | 6/1985 | Draper et al. | |
| 4,679,841 A | * | 7/1987 | Taunay | 296/76 |
| 4,747,630 A | | 5/1988 | Isomine et al. | |
| 4,773,126 A | * | 9/1988 | Voss | 16/288 |
| 4,928,441 A | * | 5/1990 | Daley | 52/19 |
| 5,613,728 A | * | 3/1997 | Smith et al. | 296/219 |
| 5,768,834 A | * | 6/1998 | Pinder | 52/202 |
| 5,788,406 A | * | 8/1998 | Hernandez | 404/25 |

(List continued on next page.)

FOREIGN PATENT DOCUMENTS

| | | |
|---|---|---|
| DE | 1 240 424 | 5/1967 |
| DE | 199 46 500 | 11/2000 |
| EP | 0 054 741 | 6/1982 |
| GB | 940318 | 10/1963 |
| GB | 1 268 179 | 3/1972 |
| GB | 1350844 | 4/1974 |

*Primary Examiner*—Jeanette Chapman
(74) *Attorney, Agent, or Firm*—Nixon & Vanderhye P.C.

(57) ABSTRACT

The object of the invention is an arrangement in hatch structure (1) to be installed in a vehicle body (2). The arrangement comprises a hatch, the edges of which are bent downwards, which hatch is mainly horizontal when in the closed position, an opening (6) in the vehicle body (2), which opening (6) is smaller than the said hatch, a packing (4) for sealing the hatch and the opening (6) in relation to each other when the hatch is closed, and a hatch operating mechanism that incorporates at least one body part (7), which has sliding faces (8, 18) for a slide (9) on which the slide (9) rests, a lever (11) that is connected to the slide (9) by means of a first joint (12) and is supported near the edge of the opening (6) in the vehicle body (2) by means of a second joint (13), and a compression spring (10) located in the slide bed, which compression spring constantly exerts force on the slide (9) so as to push it. The said body part (7) is supported on the lower surface of the hatch and the compression spring (10) presses the slide (9) towards the edge of the hatch that is at the location of the said body part (7).

16 Claims, 2 Drawing Sheets

U.S. PATENT DOCUMENTS

Figure 2:
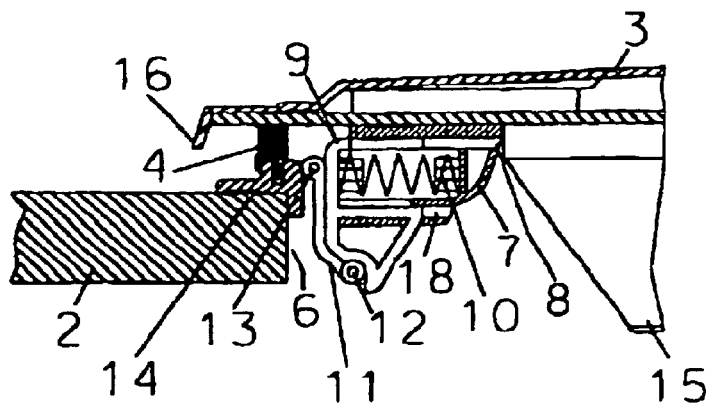

| | | | |
|---|---|---|---|
| 6,120,080 A | * | 9/2000 | Hori et al. .................... 296/56 |
| 6,283,535 B1 | * | 9/2001 | Yuge ....................... 296/146.8 |
| 6,341,809 B1 | * | 1/2002 | Chapman .................... 296/56 |
| 6,439,655 B1 | | 8/2002 | Lenhardt et al. |
| 6,572,182 B2 | * | 6/2003 | Lamparter et al. ..... 296/216.02 |
| 6,609,750 B1 | * | 8/2003 | Cauduro ................ 296/216.02 |
| 6,719,357 B2 | * | 4/2004 | Pfertner et al. .......... 296/146.8 |

* cited by examiner

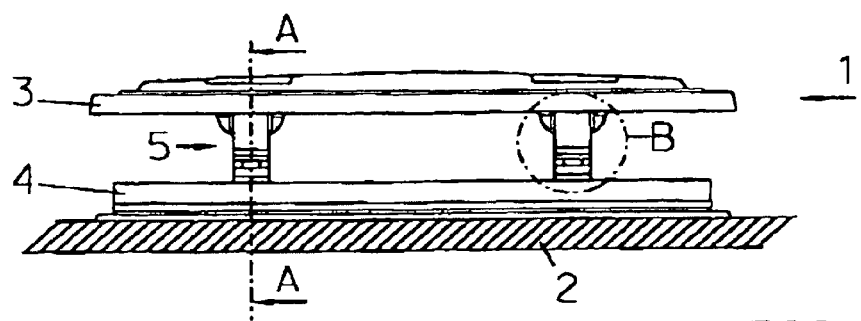
FIG. 1
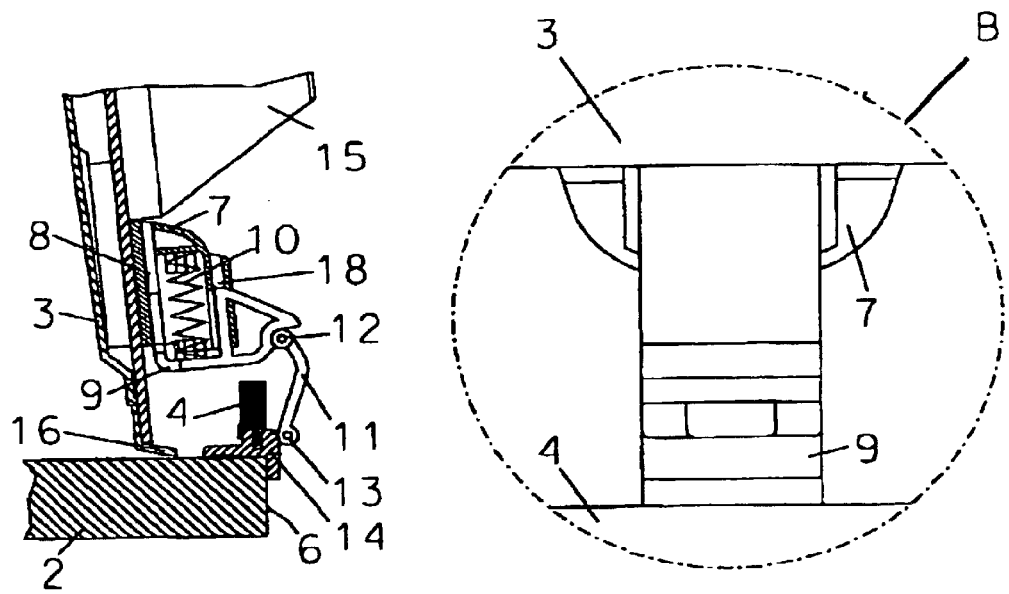
FIG. 6
FIG. 5

A-A

ARRANGEMENT IN HATCH STRUCTURE

This application is the US national phase of international application PCT/FI02/00248 filed Mar. 22, 2002 which designated the U.S.

The invention relates to an arrangement in a hatch structure which is adapted to be installed in a vehicle body for roof hatches, particularly of coaches and the like, which roof hatches are used especially to assist ventilation.

From publication DE 1 240 424 is known a widely-used roof hatch, the operating mechanism of which is, however, prone to break if the hatch is struck on route by a branch or other object. Hatch structures as described in publications GB 1 397 251 and U.S. Pat. No. 2,810,334 have very many large parts, as a result of which their structures are rather expensive to manufacture. The structure described in publication GB 1 350 844 requires fairly many joints and levers, which are very expensive and time-consuming to manufacture from metal and install as articulated structures. From publication U.S. Pat. No. 4,329,917 is known a hatch structure, whose locking arrangement is based on the locking effect of a ball pushed into a socket by means of spring power, the operation of which is to some extent uncertain unless the hatch position is carefully locked every time the hatch is operated.

The object of the invention is to present a hatch structure that is cheap to manufacture and easy to install in an opening arranged in the body of a vehicle. A particular object of the invention is to present a roof hatch, with a structure that is mechanically durable, should a branch or other object that comes into contact with the hatch be located in the line of travel. One object of the invention is also to present a hatch structure that can be used for servicing and as an emergency exit. It is clear that the hatch should be easy to operate since the person operating the hatch is often operating it for the first time. One object of the invention is that the parts of the operating mechanism are mainly of plastic for reasons of both corrosion resistance and issues relating to manufacture.

The object of the invention is achieved through an arrangement described in the characterising part of claim 1. An arrangement concerning a hatch structure to be installed in the body of a vehicle comprises a hatch with edges that are bent downwards, which hatch when in the closed position is mainly horizontal, an opening smaller than the said hatch in the body of a vehicle, packing for sealing the hatch and opening in relation to one another when the hatch is closed, and a hatch operating mechanism. The latter comprises at least one body part, which incorporates the sliding faces of a slide that are parallel to the vehicle's longitudinal axis and support the slide, a lever connected to the slide by means of a first joint and supported via another joint at a point close to the edge of the opening in the vehicle's body, and a compression spring in the slide bed that constantly exerts force on the slide in such a manner as to push it. If the said body part is supported on the lower surface of the hatch and if the compression spring presses the slide towards the edge of the hatch that is at the location of the said body part, an arrangement incorporating a structure of this kind provides a system that it is very small in size with only a few structural parts. This kind of structure is also highly durable, provided that the material chosen is a plastic that is strong and durable.

If the said first joint is positioned eccentrically to the sliding faces, and if the length of the lever is selected so that the so-called dead centre of the mechanism is near half way between the closed position and the open position of the hatch, the said compression spring holds the hatch reliably in the extreme position in which it has been left, that is open or closed.

If there is a stop arrangement in connection with the first joint with the aid of which arrangement the said lever limits the movement of the slide so that the slide is prevented from coming out of the sliding faces of the body part, the stop arrangement prevents the spring from pushing the slide too far in the slide bed. This also makes the hatch more stable when the hatch is in the open position.

If the opening in the body of the vehicle has a front edge and a rear edge that are transverse to the driving direction, and both edges have at least two support points for the operating mechanism, the mounting of the hatch structure on the said opening is very simple and easy.

If the said support points are located at a distance of 25 cm–90 cm, preferably 35 cm–60 cm from each other on the same edge, the hatch mounting will be sufficiently strong and stable.

If means for operating the hatch have been arranged under the lower surface of the hatch, by which means the front edge and correspondingly the rear edge of the hatch in relation to the driving direction can be opened and correspondingly closed mainly by pushing upwards or correspondingly mainly by pulling downwards on the operating means, it is easy for the vehicle personnel or passengers to operate the hatch structure according to the arrangement when opening or closing the hatch.

If by pushing or correspondingly pulling on the said operating means, it is possible to choose whether the front edge of the hatch or correspondingly the rear edge of the hatch in the driving direction is in the open position, the operator can choose the desired position in a simple manner.

If the operating means is rod-like and the operating means is positioned mainly horizontally close to the operating mechanisms on the same side of the hatch, it is possible to get a strong grip of the operating means, because the operation of the hatch however does require a certain amount of power.

If the rod-like operating means are located at both the front edge and the rear edge of the hatch in relation to the driving direction, the operator is able to choose the position of the hatch.

If no part of the operating means is closer than 5 cm to the edge of the opening in the vehicle's body, the arrangement is very safe to operate, provided that the operator holds on to the operating means, and thus there is no risk that the operator's hand could in any way be caught and crushed in the hatch structure.

If at least the major part of the hatch structure is of plastic, problems relating to corrosion are avoided and the parts need not be coated, since the colour of the object is determined according to the chosen raw material.

Figure 3:
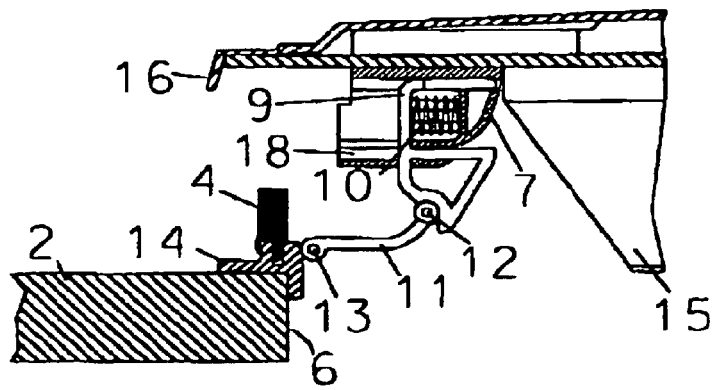
Figure 4:
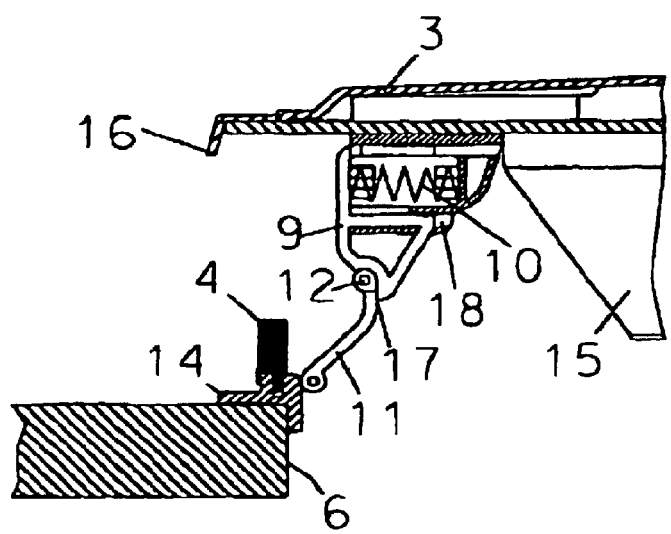

In the following, the invention is described in more detail with reference to the accompanying drawing, in which FIG. 1 is a schematic view of an arrangement according to the invention in a hatch structure in the body of a vehicle, seen from the driving direction when the hatch is in the open position, FIG. 2 is a schematic cross-sectional view of the arrangement according to FIG. 1 close to one edge of the hatch, in the direction A—A, when the hatch is closed, FIG. 3 is a schematic view of the arrangement according to FIG. 2, when the hatch is in the so-called dead centre, i.e. half open, FIG. 4 is a schematic view of the arrangement according to FIG. 2, when the hatch is in the open position, FIG. 5 is a schematic magnified view of section B of FIG. 1 and FIG. 6 is a schematic view of the arrangement according to the invention when the hatch has been turned to the emergency exit position.

The reference number 1 in FIG. 1 in the drawing refers to the roof hatch arrangement in the open position as seen from the vehicle's driving direction. The roof structure 2 of the vehicle has an opening that is smaller than the lid 3 of the roof hatch, which lid, when the hatch is closed, covers the packing 4. The lid 3 and the roof structure of the vehicle are connected by the operating mechanism 5.

FIG. 2 is a cross-sectional view of the arrangement according to FIG. 1 in the direction A—A, but the lid 3 of the roof hatch is in the closed position. The lower surface of the edge of the lid 3 is against a packing 4 that has been attached to the upper surface of the roof structure 2 near the edges of the opening 6. A body part 7 is supported against the lower surface of the lid 3 and incorporates sliding faces 8, 18 for a slide 9. Since there are two sliding faces 8, 18 at some distance from each other, the structure is strong and durable and will not break very easily. Inside the body part 7 is a compression spring 10, which is supported at one end on the body part 7 while the other end pushes the slide 9. A lever 11 is attached to the slide 9 by means of a joint 12 and the other end is mounted by means of a joint 13 on a support bracket 14 near the edge of the opening 6. The hatch can be opened 90° upwards when it is in the position according to FIG. 2, provided that the mechanisms of the hatch end are released from the joint 13, whereby the mechanisms at the other end of the hatch function as a hinge rotating correspondingly around point 13, first approximately 135°, whereby the lever 11 reaches the position shown in FIG. 4, and then turning around point 12 as its centre point, about 90° or somewhat more upwards, without opening the hatch mechanisms. In this way the roof hatch can be used for servicing and as an emergency exit hatch in accordance with the American standard.

In FIG. 3, the lid 3 of the roof hatch is in the half-open position. The slide 9 has pressed the compression spring 10 so that it is short due to effect of lever 6. Reference number 15 refers to the operating means used by the operator to close or open the hatch.

In FIG. 4 the lid 3 of the roof hatch is in its uppermost position. In rainy weather, especially when the vehicle is halted, water runs down from the bent edge 16 and therefore the lid 3 and its bent edge 16 cover a clearly larger area around the opening 6 than the area bordered by the packing 4. A stop arrangement 17 has been formed in connection with the joint 12 at the lower end of the lever 11 and the slide 9, so that the side face of the lever 11 is supported against a counter-surface arranged near the joint 12 at the lower end of the slide 9. This stop arrangement prevents the slide 9 from moving too far along the sliding faces of the body part 7. Hereby the movement of the lid 3 is also limited accurately. An additional advantage is that when the operator pulls down on the operating means 15, the lid 3 of the hatch starts to move downwards, because the lever 11 starts to turn downwards guided by a joint 13. If the hatch is open and the lid 3 or its bent edge 16 hits, for example, a branch, a bill board or the like object, located in the line of travel, the lid 3 starts to move downwards as the lever 11 starts to turn downwards, supported by the joint 13. Unless the impact is very sudden, it is possible that the roof hatch arrangement 1 remains intact and will merely be closed by the force of the impact. It should be noted that the user may choose whether he/she wants to keep the hatch totally closed, opened at both ends, or open only at one end. Here the chosen position is of great significance for the flow of air caused by the hatch while driving or correspondingly when the vehicle is halted.

FIG. 5 is a magnified view of section B of FIG. 1. In conventional hatch structures, the width of the body part 7 may be in the range of 5 cm–10 cm. This allows the slide 9 and the joint 11 to be sufficiently wide so that they can be made solid enough to keep the hatch structure stable even when the vehicle is driving at high speed.

FIG. 6 shows the arrangement, when the hatch has been turned to the emergency exit position, when the hatch is so wide open that the operating mechanism is at least almost completely away from the opening 6 in the vehicle. Therefore emergency exit is possible without any hindrance caused by the hatch in accident situations or the like. It is to be noted that the mechanism and the hatch have been dimensioned so that the bent edge 16 of the hatch is supported on the vehicle body's surface at some a distance from the opening 6. In this way, the edge 16 also functions as the opening limiter of the hatch, and at the same time the structure is strong, since stress from the weight of the hatch itself, potential wind load and possibly stress from opening the hatch suddenly is not exerted on the mechanism alone, but the limiter takes some of the stress. It is to be noted that the hatch can be closed after opening it for emergency exit. Because considerable stress is often exerted on the hatch and the parts of its operating mechanism, it is necessary to dimension the parts to be sufficiently strong and durable. It is recommended that clevis pins or the like manufactured from stainless steel be used as axles for the joints.

The structure according to the invention may be manufactured for the most part from plastic by injection moulding. This avoids problems relating to corrosion and the parts do not need to be coated, because the colour of a part is determined by material choice. The parts can be manufactured to very accurate dimensions and manufacture even of complex shapes is not difficult. Also, freer design of visible parts is possible, if the parts are manufactured by injection moulding, which is also a very fast method of manufacture suitable for mass production. Conventional methods of fastening for example with screws or rivets are not described here, since it is part of the known prior art.

The invention is not limited to the embodiment described above, but several variations are conceivable within the scope of the appended claims.

What is claimed is:

1. An arrangement in a hatch structure for installation in a vehicle body comprising:

a hatch having downwardly bent edges and being disposed substantially horizontally when in a closed position, an opening in the vehicle body which is smaller in size than said hatch, a packing for sealing the hatch and the opening in relation to one another when the hatch is in the closed position thereof, and a hatch operating mechanism to allow for movements of the hatch between said closed position wherein the hatch and the opening are sealed in relation to one another and an open position wherein the hatch is in spaced relation to the hatch, wherein said hatch operating mechanism comprises:

at least one body part fixed to a lower surface of the hatch so as to be within said opening when said hatch is in said closed position thereof, said at least one body part including slide faces which are oriented in a direction relative to a longitudinal axis of the vehicle, a slide operatively connected to the slide laces of said at least one body part so as to be slideable between an advanced position close to a respective hatch edge adjacent said at least one body part, and a retracted position which is spaced inwardly from said respective edge, a lever having one end that is connected to the slide by means of a first joint and an opposite end that is connected near the edge of the opening in the vehicle body by means of a second joint, and a compression spring operatively associated with the at least one body part so as to constantly exert a force on the slide in a direction so as to push said slide into said advanced position thereof.

2. An arrangement according to claim 1, wherein said lever is connected to said at least one body part by means of said first joint so as to be positioned eccentrically relative to the sliding faces of the the at least one body part, and wherein the lever has a length such that dead centre of the hatch operating mechanism is about half-way between the closed and open positions of the hatch.

3. An arrangement according to claim 2, wherein the first joint includes a stop arrangement which contacts said lever to thereby limit the movement of the slide to prevent disconnection of the slide from the sliding faces of the at least one body part.

4. An arrangement according to claim 3, wherein the opening in the vehicle body includes a front and rear edges transverse to driving direction of the vehicle, wherein each of said front and rear edges have at least two support points for the hatch operating mechanism.

5. An arrangement according to claim 4, wherein said support points are spaced apart from one another along a respective one of said front and rear edges by a dimension between 25 cm–90 cm.

6. An arrangement according to claim 1, comprising a respective hatch operating handle located under a lower surface of the hatch adjacent front and rear edges of the hatch in relation to the vehicle's driving direction to thereby allow the hatch at said front and rear edges thereof to be moved between said opened and closed positions by means of an operator manually lifting up or pulling down on a respective one of the hatch operating handles.

7. An arrangement according to claim 6, wherein said hatch operating handles at said front and rear edges of said hatch are independently operable so that that by means of an operator manually lifting or pulling down a respective one of said hatch operating handles, it is possible to selectively open and close one of the front and rear edges of the hatch.

8. An arrangement according to claim 7, wherein the operating handles are rod elements which are positioned substantially horizontally close to a respective hatch operating mechanism at the front and rear edges of the hatch.

9. An arrangement according to claim 1, wherein the hatch operating mechanism further comprises hatch operating rods located both front and rear edges of the hatch relative to the vehicle's driving direction.

10. An arrangement according to claim 9, wherein the hatch operating rods are positioned no closer than 5 cm to an edge of the opening in the vehicle body.

11. An arrangement according to claim 1, wherein at least a major part of the hatch operating mechanism is formed of a plastics material.

12. A hatch arrangement for a vehicle body, comprising:

a support bracket defining an opening;

a hatch lid sized to cover the opening of the support bracket; and a hatch operating assembly for allowing the hatch lid to be moved between a closed position wherein the hatch lid closes the opening, an intermediate position wherein the hatch lid is partially spaced with respect to the opening, and an opened position wherein the hatch lid is fully spaced with respect to the opening, wherein said hatch operating assembly comprises;

(i) at least one body part fixed to a lower surface of the hatch lid and defining a slide surface;

(ii) a slide member coupled to the slide surface of the at least one body part for sliding movements between an advanced position wherein the slide member is adjacent the support bracket, and a retracted position wherein the slide member is retracted inwardly away from said support bracket;

(iii) a lever having opposed ends coupled pivotally to the slide member and the support bracket; and (iv) a spring member which exerts a spring force acting against the slide member so as to urge the slide member into said advanced position thereof, wherein initial movement of said hatch lid to said intermediate position from one of said closed or opened positions responsively causes said slide member to move from said advanced position and into said retracted position against the spring force of said spring member such that continued further movement of said hatch lid from said intermediate position and into another one of said closed or opened positions thereby responsively causes said slide member to move from said retracted position and into said advanced position under influence of the spring force of said spring member.

13. The hatch arrangement of claim 12, wherein said hatch lid has downwardly bent edges.

14. The hatch arrangement of claim 12, wherein the support bracket includes a packing seal to seal the opening when the hatch lid is in said closed position thereof.

15. The hatch arrangement of claim 12, wherein a respective said hatch operating assembly is provided at forward and rearward edges of said support bracket relative to a vehicle's driving direction, each said hatch operating assembly being independent operable so that one or both of respective front and rear edges of the hatch lid is capable of being moved between said closed and opened positions thereof.

16. The hatch arrangement of claim 12, comprising an operator handle which allows an operator to manually push and pull the hatch lid to responsively move the hatch lid into its opened and closed positions, respectively.

* * * * *

UNITED STATES PATENT AND TRADEMARK OFFICE
CERTIFICATE OF CORRECTION

PATENT NO. : 6,840,572 B2
DATED : January 11, 2005
INVENTOR(S) : Sillanpää

It is certified that error appears in the above-identified patent and that said Letters Patent is hereby corrected as shown below:

<u>Title page,</u>
Item [75], Inventors, "Sillanpää" should read -- Sillanpää --

Signed and Sealed this

Nineteenth Day of April, 2005

JON W. DUDAS
*Director of the United States Patent and Trademark Office*